US008941637B2

(12) United States Patent
Ikeda

(10) Patent No.: US 8,941,637 B2
(45) Date of Patent: Jan. 27, 2015

(54) DISPLAY DEVICE INCLUDING SELF-LUMINOUS ELEMENTS AND METHOD FOR DRIVING THE SAME

(75) Inventor: Kouji Ikeda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 594 days.

(21) Appl. No.: 13/161,695

(22) Filed: Jun. 16, 2011

(65) Prior Publication Data

US 2011/0310083 A1 Dec. 22, 2011

(30) Foreign Application Priority Data

Jun. 21, 2010 (JP) ................................ 2010-140912

(51) Int. Cl.

*G06F 3/038* (2013.01)
*G09G 5/00* (2006.01)
*G09G 3/20* (2006.01)
*G09G 3/30* (2006.01)

(52) U.S. Cl.

CPC ... *G09G 3/20* (2013.01); *G09G 3/30* (2013.01)
USPC ............................................ 345/212; 345/76

(58) Field of Classification Search

CPC .................................................... G09G 3/3233
See application file for complete search history.

(56) References Cited

U.S. PATENT DOCUMENTS 7,358,938 B2 * 4/2008 Kim ................................ 345/77
8,564,513 B2 * 10/2013 Nathan et al. ................... 345/82
2005/0285825 A1 * 12/2005 Eom et al. ....................... 345/76
2011/0304593 A1 * 12/2011 Huang et al. .................. 345/204

FOREIGN PATENT DOCUMENTS

JP 2006-084899 A 3/2006

* cited by examiner

*Primary Examiner* — Kwang-Su Yang
(74) *Attorney, Agent, or Firm* — Canon USA, Inc. IP Division

(57) ABSTRACT

A display device including self-luminous emitting elements configured to suppress a display unevenness due to a transistor variation and reduce a noise when transmitting a gradation data to a pixel circuit, wherein the pixel circuit includes a driving transistor and a first switch transistor electrically connecting a gate electrode of the driving transistor with a drain electrode thereof, in which the gate electrode of the first switch transistor can be electrically connected to a data line, and the gate electrode controls a time period for which the first switch transistor conducts according to the gradation data and writes the gradation data on the pixel circuit.

3 Claims, 12 Drawing Sheets

DISPLAY DEVICE INCLUDING SELF-LUMINOUS ELEMENTS AND METHOD FOR DRIVING THE SAME

BACKGROUND OF THE INVENTION

1. Field of the Invention

The present invention relates to a display device on which a self-luminous element, particularly an organic EL element is arranged in a matrix form and a method for driving the same.

2. Description of the Related Art

A plurality of pixels including self-luminous elements such as organic EL elements is arranged in a matrix form on the display area of the display apparatus using the self-luminous elements (hereinafter referred to as a self-luminous display device). The luminance of each pixel is determined by an amount of current or voltage supplied to the self-luminous element via a driving circuit. For this reason, it is necessary to accurately control an amount of current or voltage flowing into the self-luminous element included in each pixel to perform an accurate gradation display on the spontaneous light emitting display device.

A driving circuit for controlling an amount of current or voltage supplied to the self-luminous element includes a pixel circuit provided for each pixel and a peripheral circuit for controlling the pixel circuit provided around a display area. A switching element (an active element, hereinafter, referred to as a transistor) such as a thin-film transistor is used in these circuits.

The transistor has a variation in characteristics such as a threshold (Vth) and mobility (μ) resulting from a variation in a production process. The variation appears as a display unevenness when an image is displayed. Japanese Patent Application Laid-Open No. 2006-084899 discusses a display device provided with a threshold cancel circuit for each pixel circuit to avoid the influence of variation in threshold Vth and mobility, as a technique for suppressing a variation in characteristic of the transistor.

In the conventional display device discussed in Japanese Patent Application Laid-Open No. 2006-084899, digital video data input into the display device from the outside are converted into gradation data which is an analog data voltage and transmitted to each pixel by a gradation data output circuit arranged outside the display area. If a transmission distance is long, the gradation data which is an analog data voltage are influenced by a noise and changed. Therefore, even if variation in the characteristics of the transistor is corrected, a transmission noise is added to the gradation data to preclude the display unevenness from being sufficiently corrected.

SUMMARY OF THE INVENTION

According to an aspect of the present invention, a display device including self-luminous emitting elements configured to suppress a display unevenness due to a transistor variation and reduce a noise when transmitting a gradation data to a pixel circuit, wherein the pixel circuit includes a driving transistor and a first switch transistor electrically connecting a gate electrode of the driving transistor with a drain electrode thereof, in which the gate electrode of the first switch transistor can be electrically connected to a data line, and the gate electrode controls a time period for which the first switch transistor conducts according to the gradation data and writes the gradation data on the pixel circuit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The present invention is described below with reference to drawings. In each drawing, similar or corresponding members are given the same references and the duplicated description of the members already described is omitted. The exemplary embodiment of an organic EL display device using an organic EL element is described, however, the present invention is not limited to the present exemplary embodiment. The similar configuration may be applied to a display device using a self-luminous element other than the organic EL element.

Figure 1:
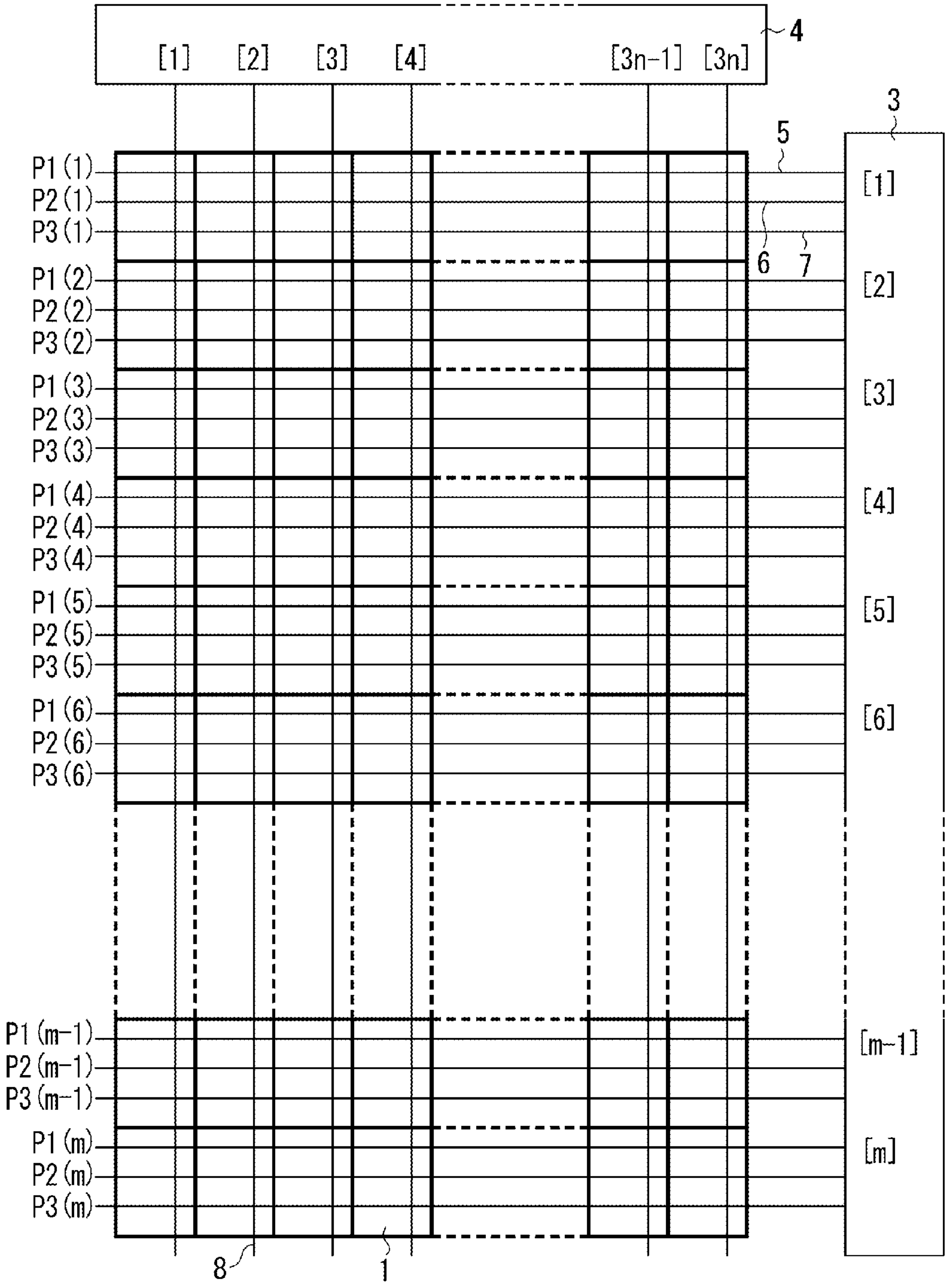
FIG. 1 illustrates an example of a display device according to the present invention.

FIG. 1 illustrates an example of a general configuration of a display device according to the present invention. The display device in FIG. 1 includes an image display unit (hereinafter also referred to as "display area") in which a display unit 1 configured of pixels of red (R), green (G), and blue (B) is arranged in two dimensions of m row×n column (m and n are a natural number). A pixel includes one organic EL element indicating any color of R, G, and B and a pixel circuit 2 (refer to FIG. 2) for supplying current or voltage to the organic EL element. A transistor is used for the pixel circuit 2.

The display device in FIG. 1 further includes a peripheral circuit for driving a pixel circuit 2 around the display area. The peripheral circuit includes a row control circuit 3 for supplying a control signal to control the operation of the pixel circuit 2 to a control signal line and a column control circuit 4 for supplying gradation data according to video data to the pixel circuit 2.

The row control circuit 3 outputs control signals P1(1) to P1(*m*), P2(1) to P2(*m*), and P3(1) to P3(*m*) for controlling the operation of the pixel circuit 2 in rows 1 to m. The number of the control signal lines 5 to 7 for transmitting the control signal is determined according to the configuration of the pixel circuit. FIG. 1 illustrates the case where number of the control signal lines are three, however, one or two control signal lines can be used as described later in a specific example.

The video data input into the column control circuit 4 from the outside are converted to a data pulse signal Vdata which is a digital gradation data in the gradation data output circuit and the data pulse signal is supplied from each output terminal of the column control circuit 4. As a method to convert video data into a pulse width, there is known a signal conversion circuit which uses a counter circuit, for example. If input video data have 256 gradations, an eight bit counter circuit may be used. More specifically, there are provided a circuit for receiving a start signal and outputting "High" and a circuit for counting time by a counter circuit according to the value of input video data and generating a delay signal according to the time. If a circuit for receiving the delay signal and changing the output to a data signal from "High" (hereinafter referred to simply H) to "Low" (referred to simply L) is available, the video data can be converted into a pulse width. The data pulse signal Vdata is input to the pixel circuit on each column via a data line 8. In FIG. 1, although the column control circuit 4 and the display area are provided on the same substrate, the column control circuit 4 may be provided on another substrate such as COG if it is electrically connected with the display area.

The pixel circuit of the display device and the method for driving the same according to the present invention are described in detail.

Figure 2:
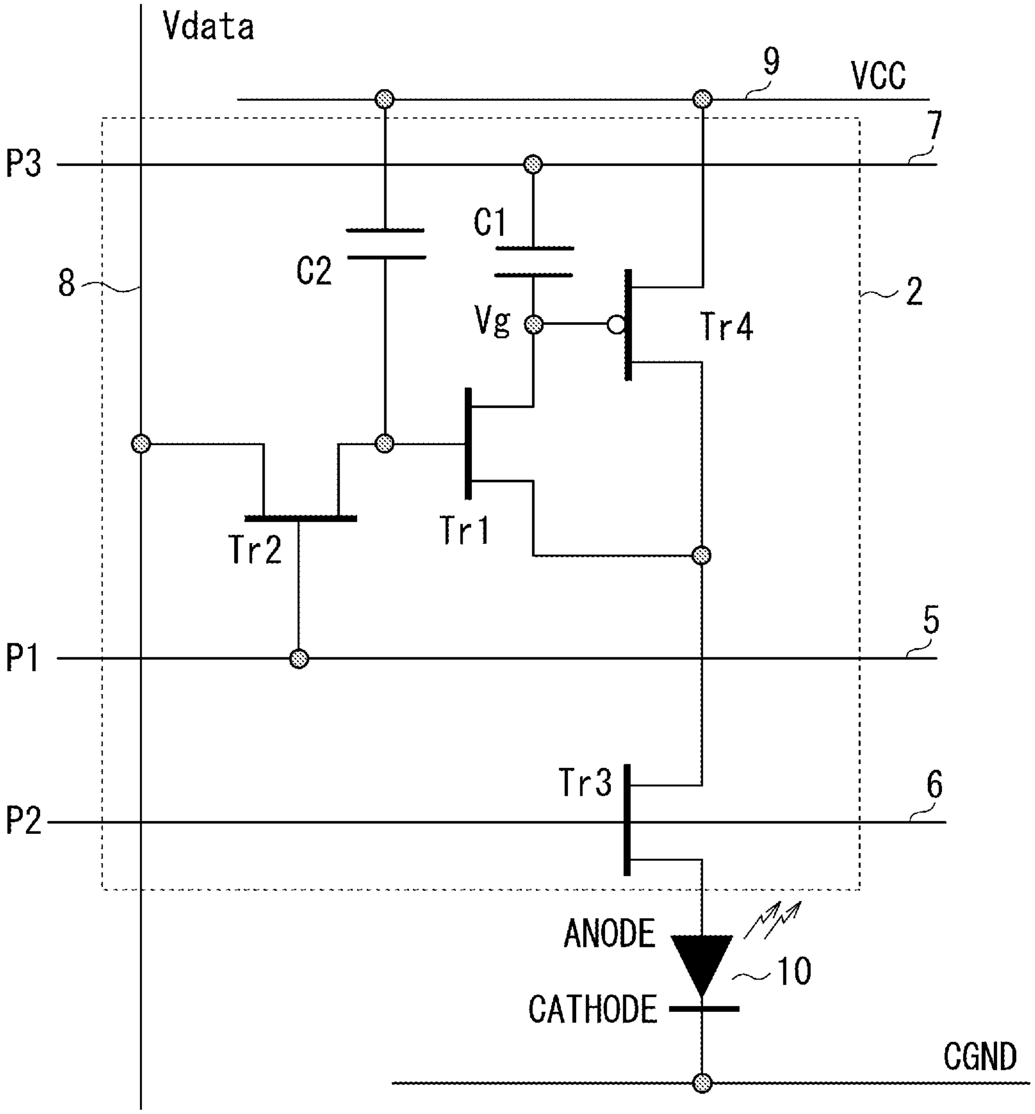
FIG. 2 illustrates an example of a pixel circuit according to the present invention.

FIG. 2 is an example of a configuration of a pixel circuit according to a first exemplary embodiment of the present invention and illustrates one of a plurality of organic EL elements included in the display unit 1 in FIG. 1 and the pixel circuit 2 connected thereto.

The pixel circuit 2 includes a pixel circuit selection unit Tr2 which is selected when the gradation data is written into the pixel circuit 2 and a storage capacitor C1 which holds the written gradation data. The pixel circuit 2 further includes a driving transistor Tr4 for supplying driving current to an organic EL element 10 according to the gradation data, a threshold compensation unit Tr1 for the driving transistor Tr4, a light emitting period control unit Tr3 for the organic EL element 10, and an auxiliary capacitor C2. In FIG. 2, a P-type transistor (PMOS) is used as the driving transistor and an N-type transistor (NMOS) is used as a transistor except the driving transistor, however, the present invention is not limited to the above transistors.

Figure 3:
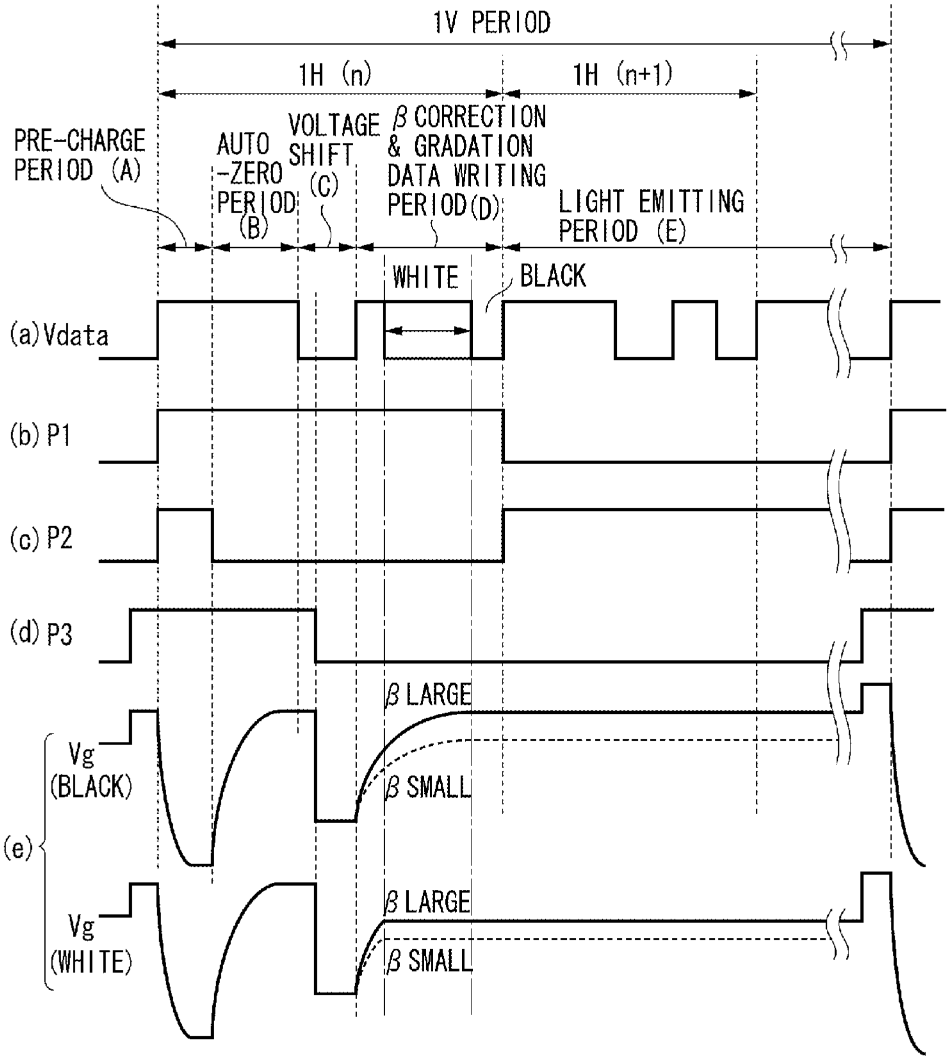
FIG. 3 is a timing chart illustrating a method for driving the pixel circuit in FIG. 2.

FIG. 3 is a timing chart illustrating an example of operation of the pixel circuit 2 in FIG. 2 and illustrates the potential of the data pulse signal Vdata supplied to the data line 8, the potential of the control signals (P1, P2, and P3) supplied to the control signal lines 5 to 7, and the gate potential (Vg) of the driving transistor Tr4. The pixel circuits included in the same row are similarly operated according to the timing chart in FIG. 3. Only one operation of one pixel circuit included in any row is illustrated in FIG. 3, however, the similar operation is sequentially repeated in other rows to allow images to be displayed according to the video signal.

The configuration of the pixel circuit is described below with reference to FIG. 2. The driving transistor Tr4 is a transistor for supplying current or voltage to an organic EL element 10. The drain and gate electrodes of the driving transistor Tr4 can be connected to each other by a switching unit, i.e., the transistor Tr1. The transistor Tr1 is used for compensating the threshold of the driving transistor Tr4. The transistor Tr2 is a switching unit for controlling the connection between the gate electrode of the transistor Tr1 and the data line and is used for selecting the target pixel circuit to which data are written. The transistor Tr3 is a switching unit for controlling the connection between the drain electrode of the driving transistor Tr4 and the anode of the organic EL element 10 and is used for controlling the light emitting period of the organic EL element 10.

The control signal lines 5 and 6 are connected to the gate electrodes of the transistors Tr2 and Tr3 respectively and control the connection state (on/off) of the transistors Tr2 and Tr3 according to control signals P1 and P2. One end of the storage capacitor C1 is connected to the control signal line 7 and the other end is connected to the gate electrode of the transistor Tr4.

One end of the auxiliary capacitor C2 is connected to the gate electrode of the transistor Tr1 and the other end is connected to a power supply line 9 for supplying electric power. The auxiliary capacitor C2 does not need to be provided if the gate capacitance and the parasitic capacitance of the transistor Tr1 are large enough. The other end of the auxiliary capacitor C2 may be connected to the gate electrode or the control signal line 5.

The source electrode of the driving transistor Tr4 is connected to the power supply line 9. The drain electrode of the driving transistor Tr4 is connected to the anode of the organic EL element 10 via the transistor Tr3. The cathode of the organic EL element 10 is connected to a CGND wiring.

A method for driving the pixel circuit in FIG. 2 is described below with reference to FIG. 3. As illustrated in FIG. 3, the method for driving the pixel circuit can be described with the operation divided into five periods, i.e., a pre-charge period (A), an auto-zero period (B), a voltage shift period (C), a β correction and a gray-scale data writing period (D), and a light emitting period (E). A period from the start of programming data into a pixel in a row to the start of programming data into a pixel in a next row is referred to as 1H period (horizontal writing period). FIG. 3 illustrates an example of drive in which the periods (A) to (D) are summed up and the summation corresponds to 1H period.

In the pre-charge period (A), the gate potential Vg of the driving transistor Tr4 is lowered and the driving transistor Tr4 is set to "on".

If the control signals P1 and P2 is set to "High", the transistors Tr2 and Tr3 turns on, then the gate of the transistor Tr1 becomes equal to the data line 8 in potential and the drain of the transistor Tr4 becomes equal to the anode of the organic EL element 10 in potential. The control signal P3 is set to "High" at this timing preliminary to lower the potential later.

At this point, the potential of the data line 8 is set to a value (High) high enough to turn on the transistor Tr1, then the transistor Tr1 turns on and the drain and gate electrodes of the driving transistor Tr4 are electrically short-circuited to render the driving transistor Tr4 in a diode connection state. Then, the driving transistor Tr4 is turned on to connect the gate electrode of the driving transistor Tr4 to the CGND via the transistor Tr3 and the organic EL element 10, which sufficiently lowers the gate potential Vg. Since the control signal P3 is set to "High", the gate potential Vg is momentarily increased, however, the transistors Tr1 and Tr3 are turned on to eventually make the gate potential Vg low enough.

In the auto-zero period (B), the voltage between the gate and the source of the driving transistor Tr4 is set to the threshold voltage of the driving transistor Tr4.

When the control signal P2 is set to Low to turn off the transistor Tr3, the drain current flowing through the driving transistor Tr4 flows into the gate of the driving transistor Tr4 to increase the gate potential Vg. The gate potential Vg continues increasing until the drain current stops flowing, in other words, until the voltage (Vgs) between the gate and the source of the driving transistor Tr4 reaches the threshold voltage (Vth). A time period required until the voltage (Vgs) between the gate and the source reaches the threshold voltage (Vth) is different depending on characteristics (threshold and mobility) of the driving transistor Tr4, however, the voltage (Vgs) between the gate and the source can be set to about the Vth irrespective of the characteristics of the transistor if time elapses to some extent. As a result, the storage capacitor Cl holds a difference between a potential Vp3H in a state where the control signal P3 is in a "High" state and the gate potential Vg =(Vcc −Vgs) =(Vcc −Vth) of the driving transistor Tr4. The voltage ($V_{p3H}$ $-V_g$&) =($V_{p3H}$ −Vcc +Vth) held in the storage capacitor C1 is referred to as an auto-zero voltage.

In the voltage shift period (C), the gate potential Vg of the driving transistor Tr4 is lowered to make the voltage Vgs between the gate and the source of the driving transistor Tr4 greater than the threshold voltage (Vth), and the driving transistor Tr4 is turned on again. Since the control signal P1 is set to "High" following the auto-zero period (B) to turn on the transistor Tr2, the gate electrode of the transistor Tr1 is connected to the data line 8 via the transistor Tr2. When the data line 8 is set to a sufficiently low potential Low, the transistor Tr1 is turned off. After this, the control signal P3 is set to "Low," the voltage (Vgs) between the gate and the source of the driving transistor Tr4 becomes $Vcc-Vg=Vcc-\{V_{p3L}-(V_{p3H}-Vcc+Vth)\}=V_{p3H}-V_{p3L}+Vth>Vth$ (because, $V_{p3H}>V_{p3L}$), the driving transistor Tr4 is turned on.

As is clear from the above equation, the driving transistors Tr4 can be aligned by the operation in this period in a state where the driving transistors Tr4 are turned on by a change in potential ($V_{p3H}-V_{p3L}$) from the threshold voltage (Vth) to the control signal P3 even if variation in the threshold voltage (Vth) is caused between a plurality of the driving transistors Tr4 in the display area. Actually, the voltage (Vgs) between the gate and the source of the driving transistor Tr4 is influenced by not only the storage capacitor C1, but also the gate capacitance and the parasitic capacitance connected to the driving transistor Tr4. The influence is such that change in the voltage (Vgs) according to change in potential of a P3 control line is merely reduced by being divided by the gate capacitance and the parasitic capacitance connected to the gate of the driving transistor Tr4. More specifically, as is the case where the gate capacitance and the parasitic capacitance connected to the driving transistor Tr4 do not exist, an effect can be obtained that the voltage Vgs between the gate and the source of the driving transistor Tr4 is made greater than the threshold voltage Vth.

In the β correction and gradation data writing period (D), the transistor Tr1 is turned on for the period according to the gradation data to write the gate potential Vg according to the gradation data into the pixel circuit. How long the transistor Tr1 is turned on may be determined with reference to the voltage between the gate and the source and the drain current calculated by the size, material and storage capacitance of the transistor. After the variation in the threshold voltage (Vth) of the driving transistor Tr4 is reduced in the voltage shift period (C), the gate potential Vg is set according to the current flowing through the driving transistor Tr4, so that the variation in mobility is also reduced. A specific operation and a mechanism in which the variation in mobility is reduced are described below.

The data line 8 is set to the potential "High" at which the transistor Tr1 is turned on with the transistor Tr2 turned on. Then, the transistor Tr1 is turned on and the current flowing into the gate of the driving transistor Tr4 via the drain of the driving transistor Tr4 and the transistor Tr1 from the power supply line 9 increases the gate potential Vg. The speed of increase in the gate potential Vg is influenced by the current supply capacity of the driving transistor Tr4, i.e., the mobility thereof. A transistor high in mobility is higher in current supply capacity than a transistor low in mobility, so that the amount of current flowing per unit time increases to raise the gate potential Vg in a short time period. In other words, the gate potential Vg of the transistor which is high in mobility increases in a short time period to substantially turn off the driving transistor Tr4, so that the amount of flowing current rapidly decreases. On the other hand, the transistor low in mobility is low in current supply capacity, so that the amount of current flowing per unit time is small to take time to raise the gate potential Vg and slacken a change in the amount of flowing current.

Thereafter, when it reaches time corresponding to the gradation data, the potential of the data line 8 is rendered "Low" to turn off the transistor Tr1, and thereby disconnecting the transistor Tr1 from the data line 8. In a case where high gradation data are written in a pixel, i.e., a current flowing into the driving transistor Tr4 is desired to be increased, a time period for which the potential of the data line 8 is rendered "High" is shortened to decrease a time period for which the transistor Tr1 conducts to the data line 8. This inhibits increase in the gate potential Vg of the driving transistor Tr4 to increase the voltage between the gate and the source. On the other hand, in a case where low gradation data are written in a pixel, i.e., a current flowing into the driving transistor Tr4 is desired to be inhibited, a time period for which the potential of the data line 8 is rendered "High" is lengthened to increase a time period for which the transistor Tr1 conducts to the data line 8. This sufficiently raises the gate potential Vg of the driving transistor Tr4 to lower the voltage between the gate and the source. The gate potential Vg thus set according to the gradation data is held by the storage capacitor C1.

In the present exemplary embodiment, the gradation data are written into the pixel by a time period for which the potential of the data line 8 is rendered "High". More specifically, the present exemplary embodiment is characterized in that, before the gate potential Vg of the driving transistor Tr4 is raised to converge the voltage Vgs between the gate and the source to the threshold voltage, the potential of the data line 8 is rendered "Low" by the time period according to the gradation data to write a gradation into each pixel.

Values required of the data line 8 for writing the gradation data into the pixel may be binary including "High" and "Low", i.e., a digital value, and an accurate change in potential is not required unlike analog data. Therefore, even if the potential of the data line 8 is slightly changed and if the potential is in the range of the voltage which the transistor Tr1 recognizes as "High" or "Low", the image to be displayed is not influenced. This allows realizing the display device high in noise immunity in writing the gradation data according to video data into each pixel.

In the light emitting period (E), a driving current according to the gate voltage of the driving transistor Tr4 is supplied to the organic EL element. The driving transistor Tr4 functions like a constant current source. In this period, the transistor Tr2 is turned off and the data line 8 is connected to other pixel circuits included in the same column and supplied with a signal of "High" or "Low" according to the gradation data written into other pixels.

According to the present exemplary embodiment, the gradation data can be written into the pixel by the length of time period for which the data line is rendered "High," i.e., by the digital data, so that the gradation data writing, which is immune to noise, can be realized.

In a conventional pixel circuit, when the pre-charge period (A) ends, the gate potential Vg, of which a variation in the threshold voltage and mobility is not corrected, is set to the gate electrode of the driving transistor Tr4. In the β correction and gradation data writing period (D), variation in the gate potential Vg of the driving transistor Tr4 and variation in the threshold voltage and mobility disperses current flowing through the driving transistor Tr4. According to the present exemplary embodiment, however, in the pixel circuit of the driving transistor Tr4 through which much current flows, the gate potential Vg is increased in a short time period and the driving transistor Tr4 is substantially turned off. In the pixel circuit of the driving transistor Tr4 through which small current flows, the gate potential Vg is hard to raise. For the same time period, the driving transistor Tr4 through which much current can flow is high in the gate potential Vg, so that the driving transistor Tr4 is substantially turned off, and the flowing current becomes small. This resultantly further reduces an originally small variation in current among the driving transistors Tr4 to allow displaying an image which is good in image quality and whose luminance unevenness is further inhibited.

Figure 4:
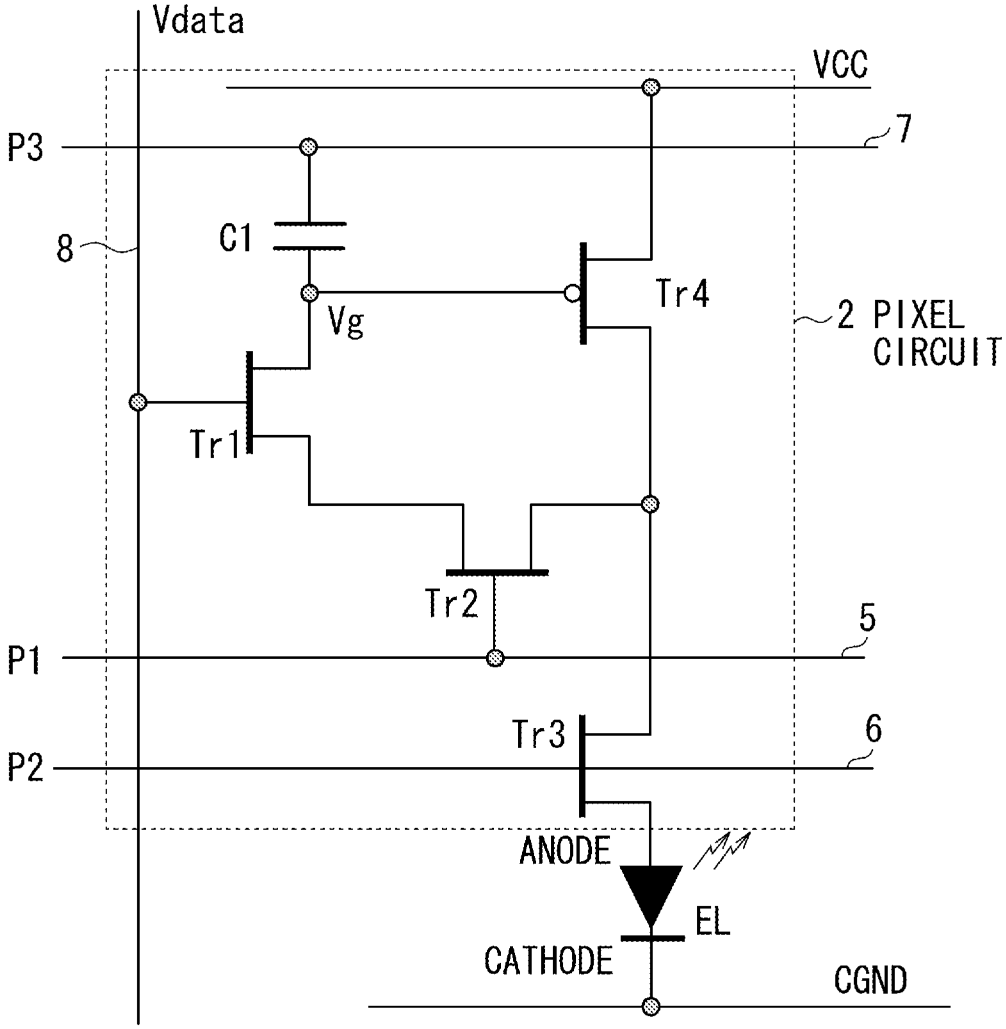
FIG. 4 illustrates an example of modification of the pixel circuit according to the present invention.
Figure 5:
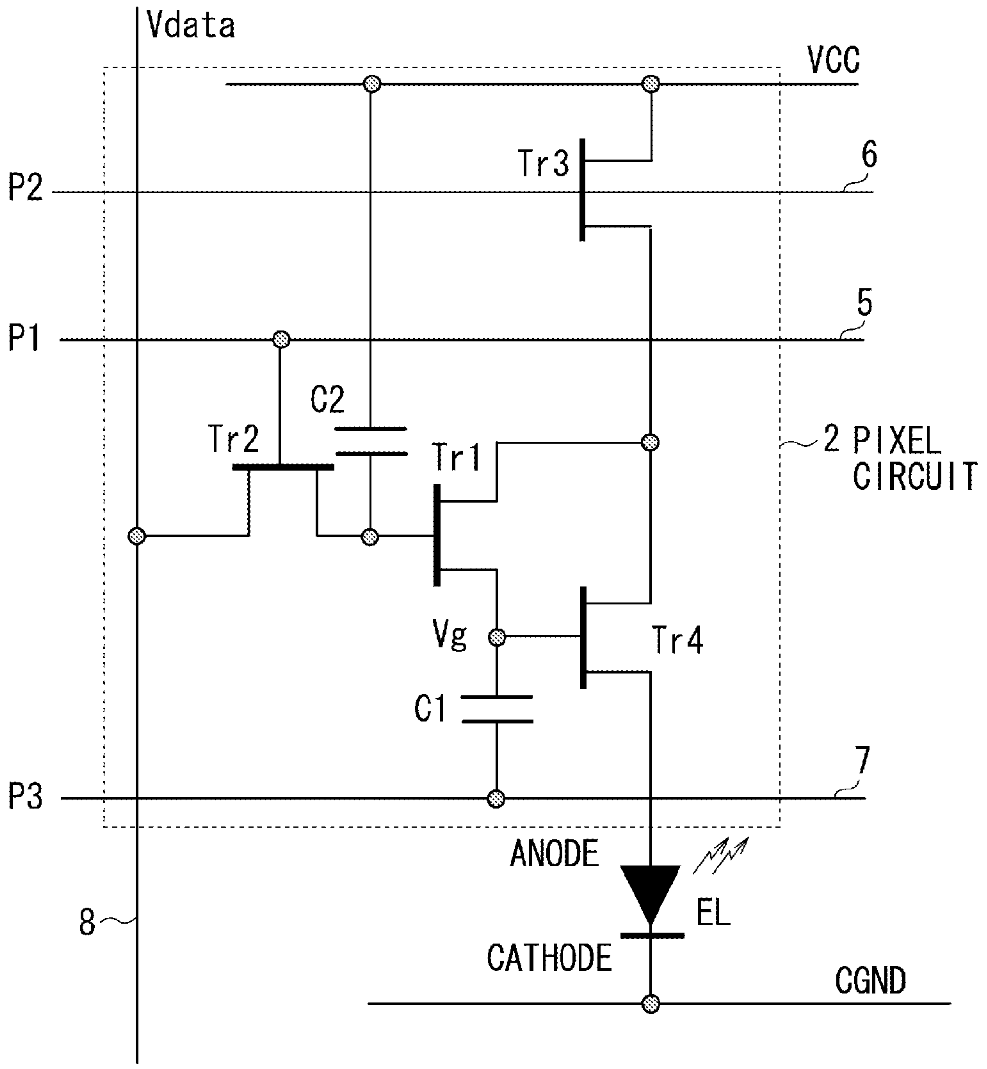
FIG. 5 illustrates an example of modification of the pixel circuit according to the present invention.
Figure 6:
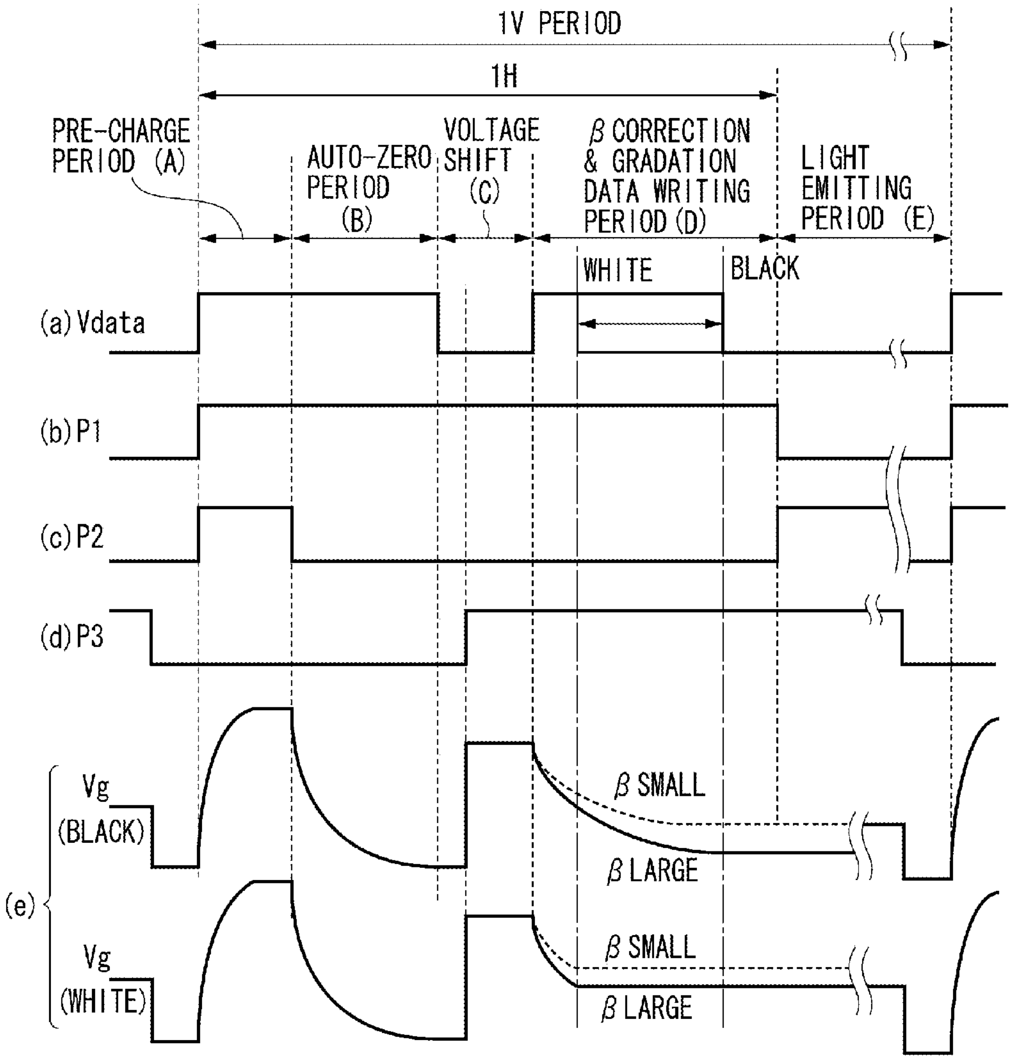
FIG. 6 is a timing chart illustrating a method for driving the pixel circuit in FIG. 5.

In the present exemplary embodiment, although operation is described using the pixel circuit illustrated in FIG. 2, the present invention is not limited to the pixel circuit illustrated in FIG. 2. For example, if a position where the transistor Tr2 is connected as illustrated in FIG. 4 is changed, a similar effect can be obtained using the method for driving the pixel circuit according to the present invention. Alternatively, as illustrated in FIG. 5, an NMOS may be used as the driving transistor Tr4. Also in a case where the NMOS is used as the driving transistor Tr4, the transistor Tr1 as a switching unit is connected between the drain and the gate of the driving transistor Tr4. FIG. 6 is a timing chart illustrating an example of operation of the pixel circuit in FIG. 5. Although change in the gate potential Vg of the driving transistor Tr4 is different from the one in FIG. 3, the pixel circuit has only to be driven in similar to that in FIG. 3. The description thereof is omitted herein. If display in black is insufficient, a control line connected to the gate of the driving transistor Tr4 via a capacitor is added and the potential of the control line is rendered Low when a data is written and the potential is raised by a predetermined potential when the light is emitted, so that black is further enhanced.

In a case where a pixel circuit is formed using a process in which variation in characteristics of the threshold and mobility of the transistor is relatively small, the variation in the threshold and the mobility may be collectively corrected. More specifically, the auto-zero period (B) and the voltage shift period (C) are omitted in programming the gradation data and only the pre-charge period (A) and the β correction and gradation data writing period (D) may be performed in 1H period for which data are written into each row.

Figure 7:
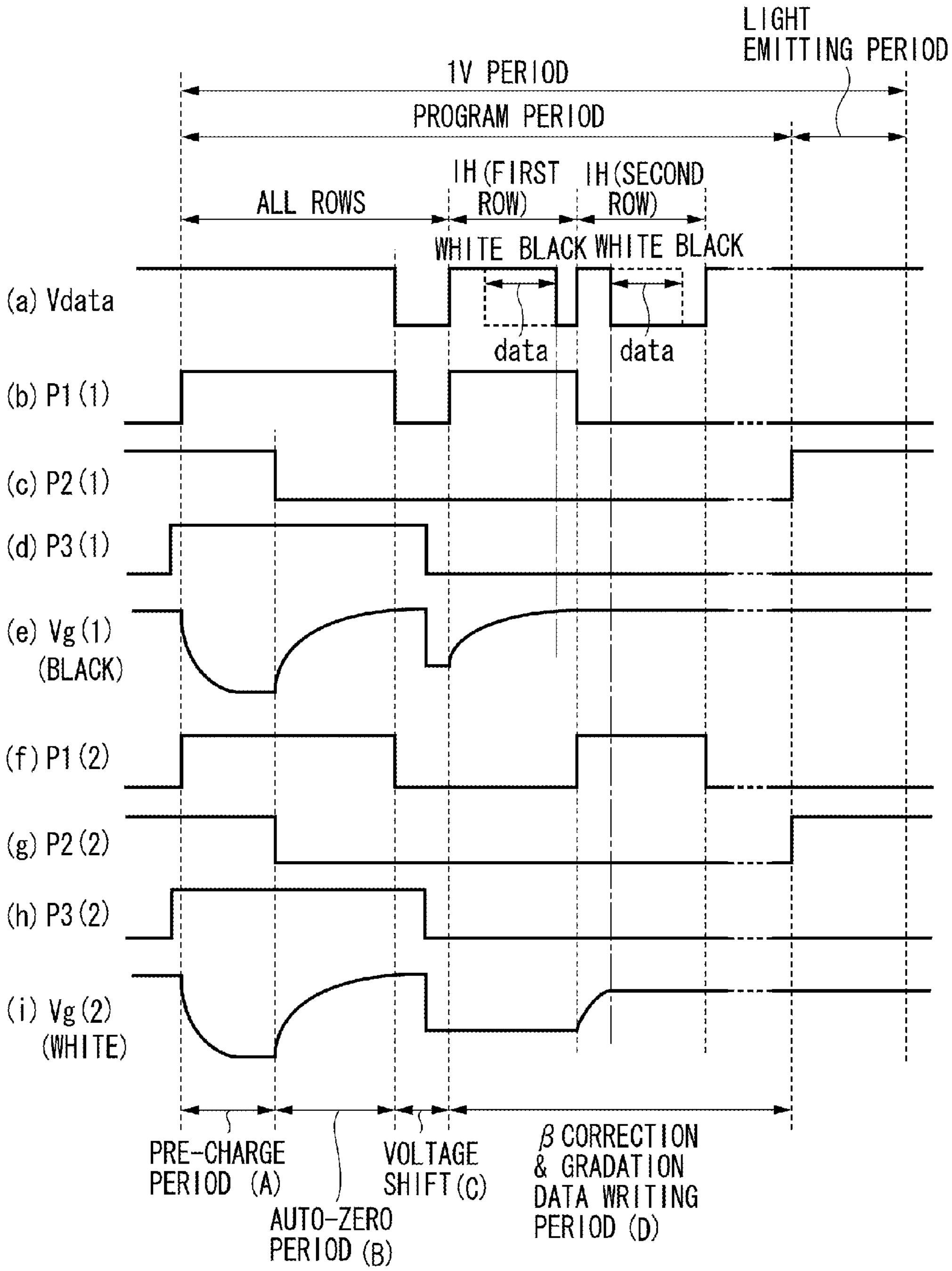
FIG. 7 is a timing chart illustrating another method for driving the pixel circuit in FIG. 2.

A pixel circuit in a second exemplary embodiment is similar to the one in the first exemplary embodiment. A driving method in the second exemplary embodiment is different from the one in the first exemplary embodiment. The first half of the 1V period (one vertical period) is taken as a program period and the second half thereof is taken as a light emitting period. The 1V period refers to a time period from when one still picture is started to be programmed until when the next still picture is started to be programmed. The operation of a pixel circuit is described below with reference to FIG. 7.

In the program period, the second exemplary embodiment is different from the first exemplary embodiment in that the operation in the periods (A), (B), and (C) is collectively provided for the pixels in all the rows at the beginning of the program period. After that, the β correction and gradation data writing operation is performed in the period (D) on a row-by-row basis and then the light emitting operation is simultaneously performed in all the rows in the period (E). The operation in the periods (A), (B), and (C) is collectively provided in all the rows. Therefore, the pre-charge and the auto-zero operation can be surely performed with longer time per row than the operation provided in the periods (A), (B), and (C) on a row-by-row basis. In the 1H period, only the β correction and gradation data writing operation in the period (D) is performed to produce a temporal allowance, enabling increasing the longest time period for which the voltage of the data line 8 is rendered "High" when a data is written. As a result, programming for deep black is enabled.

Figure 8:
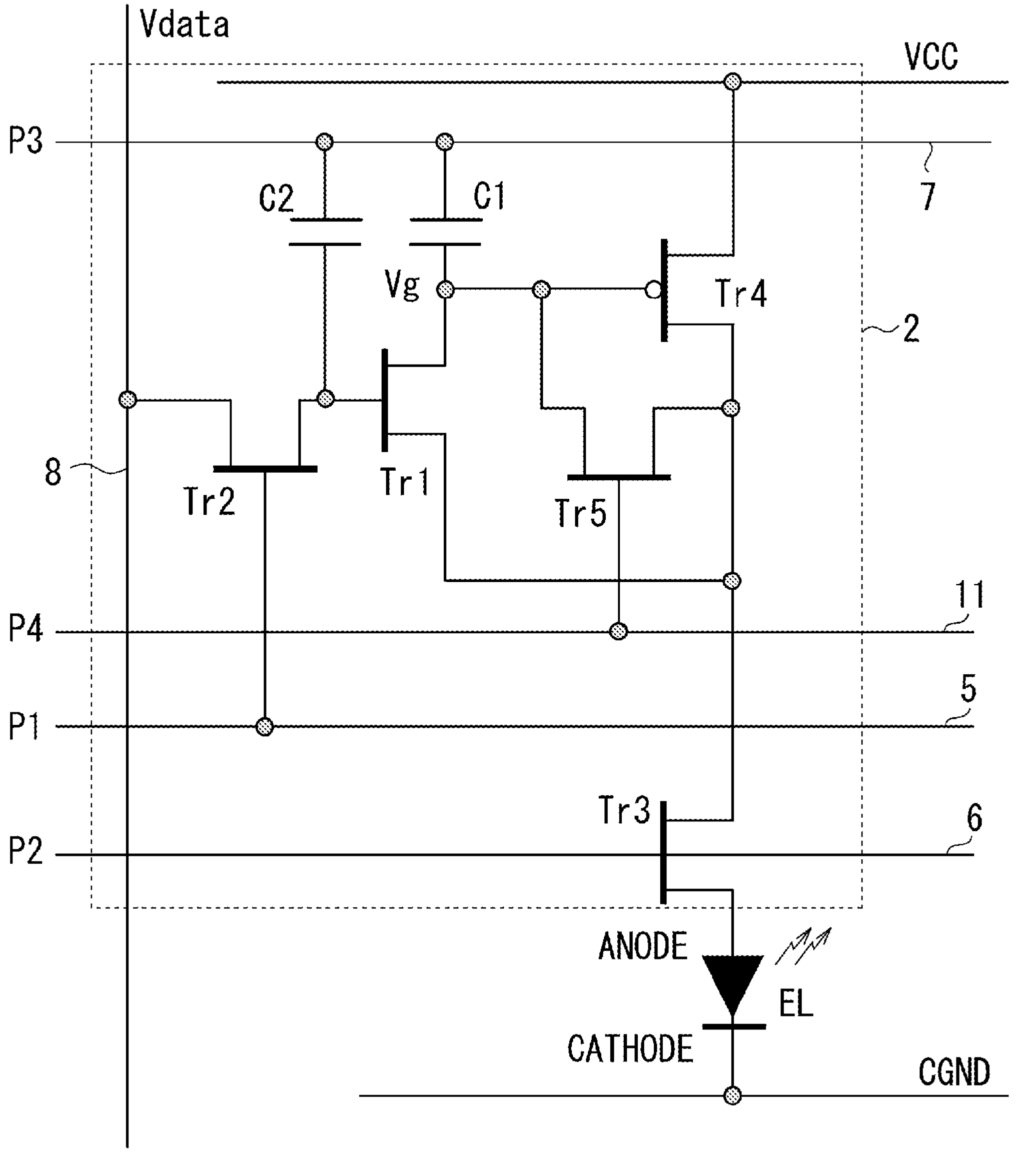
FIG. 8 illustrates an example of a pixel circuit according to a third exemplary embodiment.
Figure 9:
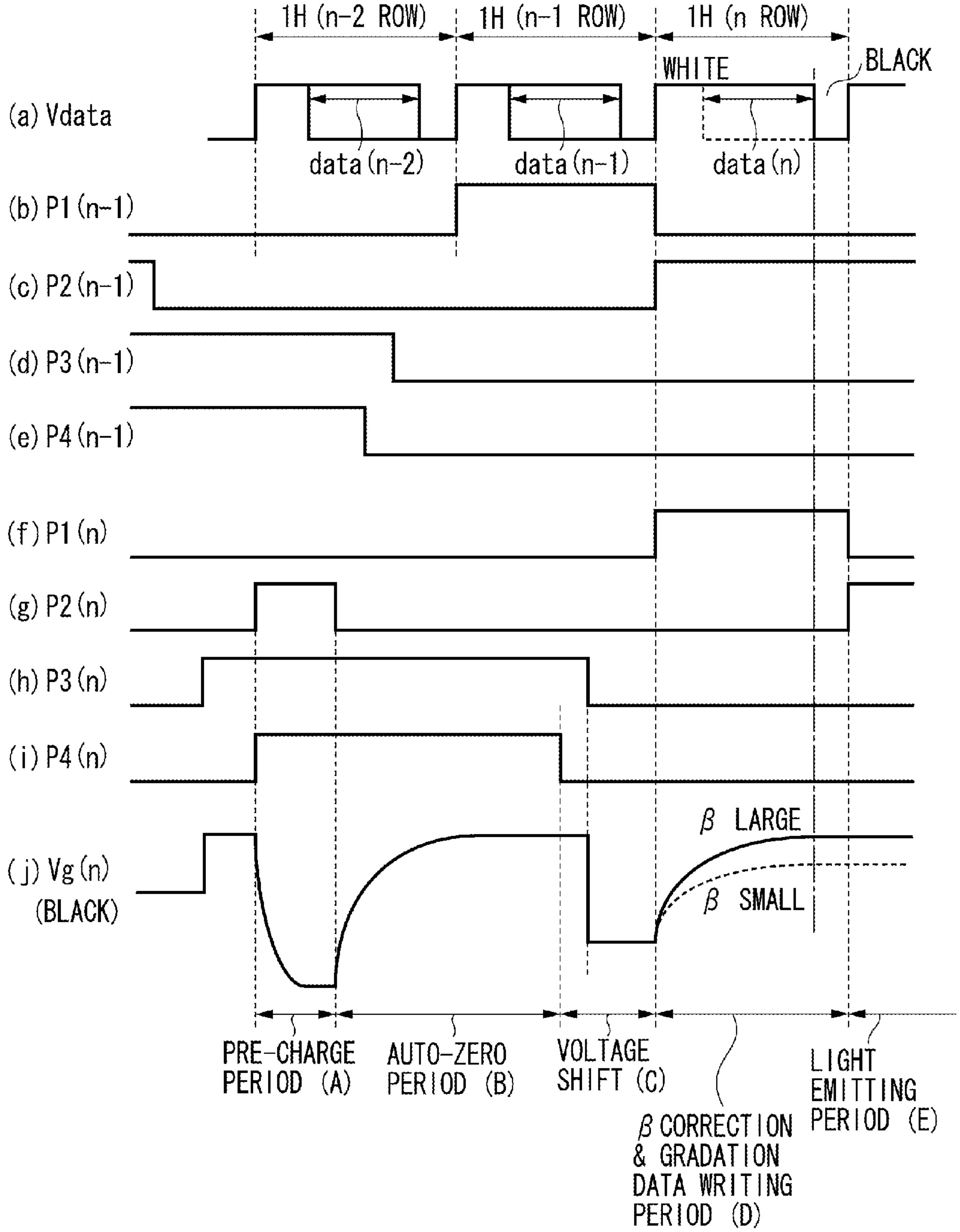
FIG. 9 is a timing chart illustrating a method for driving the pixel circuit in FIG. 8.

In a third exemplary embodiment, the pixel circuit 2 illustrated in FIG. 8 is used. The pixel circuit 2 illustrated in FIG. 8 is different from that in FIG. 2 in that a switch transistor Tr5 and a control signal line 11 are newly added. The gate of the switch transistor Tr5 is connected to the control signal line 11. The switch transistor Tr5 is connected between the gate and the drain of the driving transistor Tr4 in parallel with the transistor Tr1. A time chart for the operation of the pixel circuit is illustrated in FIG. 9. In the present exemplary embodiment, the addition of the switch transistor Tr5 and the control signal line 11 allows executing the periods (A) to (C) in a row n desired to be programmed until the program period in the preceding row (n−1) is finished. Furthermore, the arbitrary periods (A) to (C) can be set independently of the length of the 1H period.

The operation in each period is described in detail below with reference to FIGS. 8 and 9.

In the pre-charge period (A), unlike the first exemplary embodiment, the transistors Tr5 and Tr3 are turned on to lower the gate potential Vg of the driving transistor Tr4, and the driving transistor Tr4 is set to "on".

When the control signals P4 and P2 are rendered "High," the transistors Tr5 and Tr3 are set to "on" to make the gate and the drain of the driving transistor Tr4 and the anode of the organic EL element 10 equal in potential to one another. At this point, the gate and the drain of the driving transistor Tr4 is electrically connected, so that the driving transistor Tr4 becomes a diode connection state. The driving transistor Tr4 is set to "on" and the gate of the driving transistor Tr4 is connected to the CGND via the transistor Tr3 and the organic EL element 10, thereby the gate potential Vg is sufficiently lowered.

The control signal P3 is previously rendered "High" at this timing to perform operation for lowering potential later. The control signal P3 is controlled to be in a condition of "High", so that the gate potential Vg momentarily rises via the storage capacitor C1. However, the transistors Tr1 and Tr3 are turned on, so that eventually the gate potential Vg is sufficiently lowered.

In the auto-zero period (B), the transistor Tr3 is set to "off" to set the voltage between the gate and the source of the driving transistor Tr4 to the threshold voltage of the driving transistor Tr4. The control signal P2 is set to "Low" and the transistor Tr3 is set to "off". Then the drain current flowing through the driving transistor Tr4 flows into the gate of the driving transistor Tr4 via the transistor Tr5, so that the gate potential Vg increases. The gate potential Vg of the driving transistor Tr4 continues to rise until the voltage (Vgs) between the gate and the source of the driving transistor Tr4 reaches the threshold voltage (Vth) at which the drain current stops flowing. When the voltage (Vgs) between the gate and the source of the driving transistor Tr4 reaches the threshold voltage (Vth), the drain current stops flowing into the driving transistor Tr4, so that the gate potential Vg is set to the threshold voltage (Vth). A required time period until the voltage (Vgs) between the gate and the source reaches the threshold voltage (Vth) is different depending on characteristics (threshold and mobility) of the driving transistor Tr4, however, the voltage (Vgs) between the gate and the source can be set to about the Vth irrespective of the characteristics of the transistor if time elapses to some extent. As a result, the storage capacitor C1 holds the auto-zero voltage.

In the voltage shift period (C), the gate potential Vg of the driving transistor Tr4 is lowered to make the voltage (Vgs) between the gate and the source of the driving transistor Tr4 greater than the threshold voltage (Vth), then the driving transistor Tr4 is set to "on" again.

If the control signal P4 is set to a lower potential "Low", the transistor Tr5 is set to "off". Thereafter, if the control signal P3 is set to "Low", the voltage (Vgs) between the gate and the source of the driving transistor Tr4 becomes $V_{p3H}-V_{p3L}$+Vth as is the case with the first exemplary embodiment, so that the driving transistor Tr4 is set to "on". The driving transistor Tr4 can be aligned by the operation in this period in a state where the driving transistors Tr4 are set to "on" by a change in potential ($V_{p3H}-V_{p3L}$) from the threshold voltage (Vth) to the control signal P3 even if there is a variation in the threshold voltage (Vth) between a plurality of the driving transistors Tr4 in the display area.

In the present exemplary embodiment in which the switch transistor Tr5 and the control signal line 11 are added, the data line 8 does not play a role in the operation in the periods (A) to (C), so that the operation in the periods (A) to (C) can be conducted separately from the operation for writing the gradation data. Therefore, as illustrated in FIG. 9, the periods (A) to (C) in the row n desired to be programmed can be executed in the program period in rows (n−2) and (n−1).

In the β correction and gray-scale data writing period (D), the transistor Tr1 is set to "on" for the time period according to the gradation data, so that the gate potential Vg according to the gradation data is written into the pixel circuit. Variation in the threshold voltage (Vth) of the driving transistor Tr4 is reduced in the voltage shift period (C) and then the gate potential Vg is set according to current flowing through the driving transistor Tr4, so that variation in mobility is also reduced. A specific operation and a mechanism for inhibiting the variation in mobility are similar to those in the first exemplary embodiment, so that the description is omitted herein. The control signal P4 in this period remains "Low."

In the light emitting period (E), the transistor Tr3 is set to "on", the organic EL element is supplied with driving current according to the gate voltage of the driving transistor Tr4. The driving transistor Tr4 functions like a constant current source. The transistor Tr2 is set to "off" in this period. The data line 8 is connected to other pixel circuits included in the same column and supplied with signal "High" or "Low" according to the gradation data written into other pixels.

In the present exemplary embodiment, the periods (A) to (C) have only to be ensured until the 1H period of a writing row starts, so that a long time period can be taken to surely conduct the pre-charge and the auto-zero operation. In the 1H period, only the β correction and gradation data writing operation is performed in the period (D) to produce a temporal allowance, so that the longest time period for which the voltage of the data line 8 is rendered "High" in writing data is enabled to increase. As a result, programming for deep black is enabled. There is no need for separating the light emitting period from the program period and a sufficiently long light-emitting period can be acquired.

In a fourth exemplary embodiment, a configuration for the case where one display unit is formed of a plurality of pixels and a method for driving a pixel circuit are described below using an example in which one display unit is formed of pixels R, G, and B.

Figure 10:
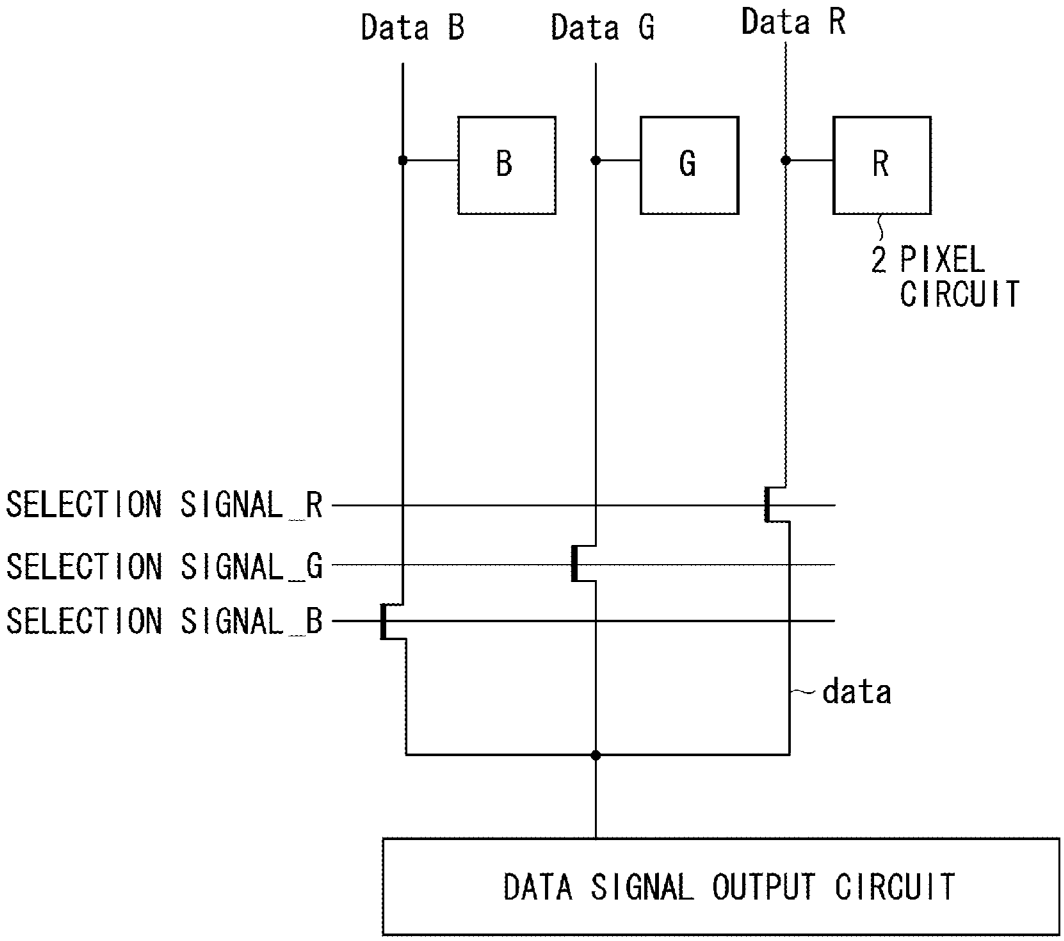
FIG. 10 illustrates a configuration of a data line according to a fourth exemplary embodiment.
Figure 11:
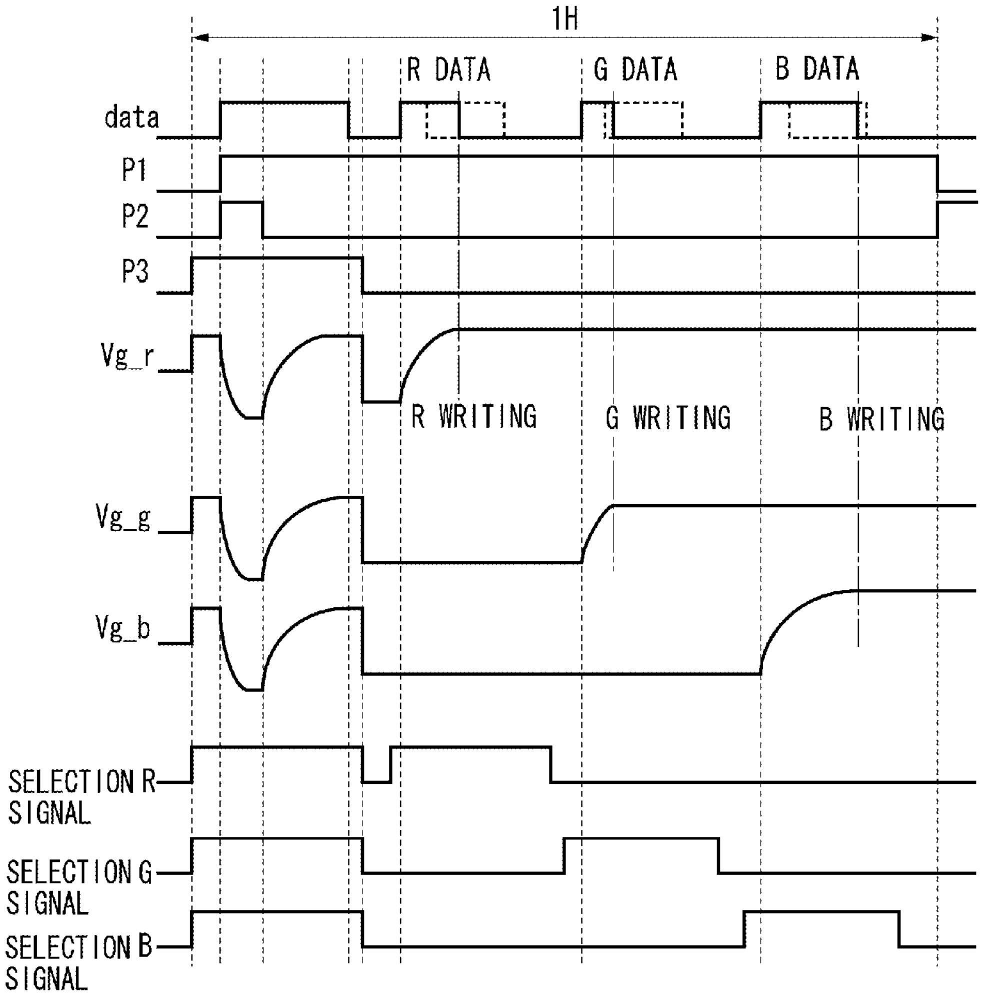
FIG. 11 is an example of a timing chart illustrating a driving method according to the fourth exemplary embodiment.

As illustrated in FIG. 10, data lines for supplying each pixel with gradation data are connected to one data supply line via their respective selection switches and connected to the output terminal of a gradation data output circuit. The pixel circuit illustrated in FIG. 2 is used for each pixel. Such a configuration can be used particularly for a display device with a large number of display units, because the configuration allows inhibiting increase in the number of the output terminals of the gradation data output circuit. FIG. 11 illustrates a driving method. After the pixels R, G, and B are collectively operated in the periods (A) to (C), i.e., the pre-charge, auto-zero, and voltage shift periods, gradation data are sequentially written into each pixel. Each operation may be controlled similarly to the one in the first exemplary embodiment.

Figure 12:
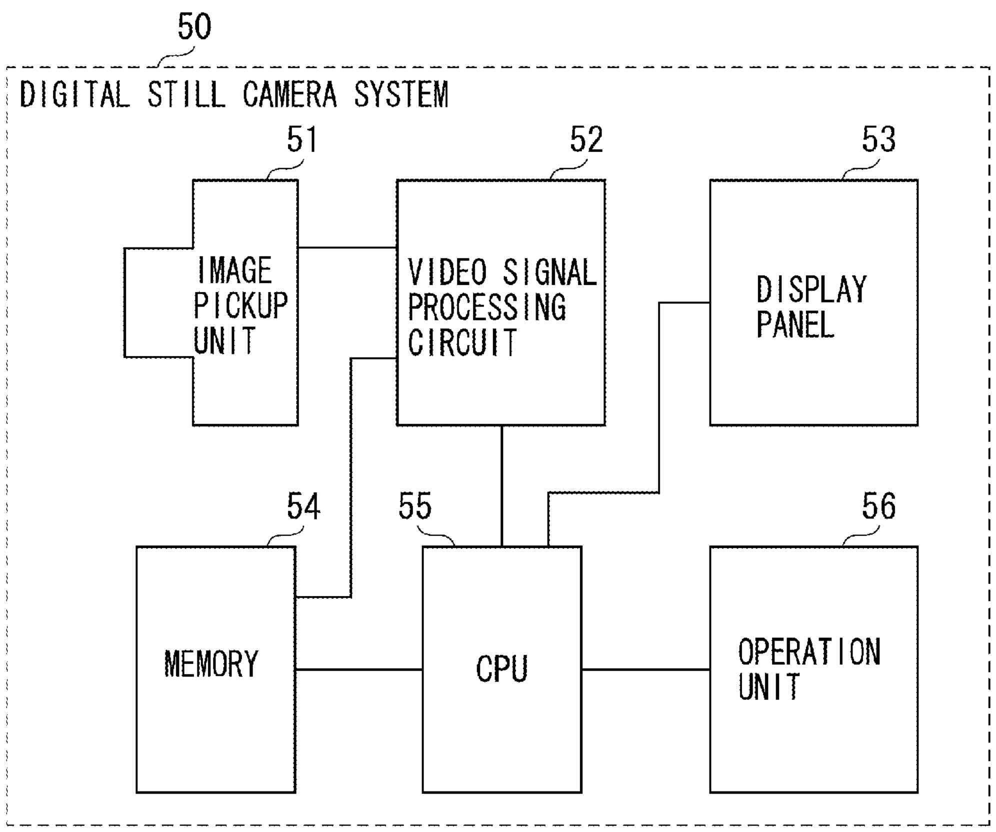
FIG. 12 is a block diagram of a general configuration of a digital still camera system using the display device according to the present invention.

In a fifth exemplary embodiment, an example is described in which the display device according to the present invention is used for a device. FIG. 12 is a block diagram of a digital still camera system using the display device according to the third exemplary embodiment, for example. A digital still camera system 50 includes an image pickup unit 51, a video signal processing circuit 52, a display panel 53, a memory 54, a CPU 55, and an operation unit 56. The display device according to the present invention is used for the display panel 53. The image captured by the image pickup unit 51 or the image stored in the memory 54 is processed in the video signal processing circuit 52 and displayed on the display panel 53. The CPU 55 controls the image pickup unit 51, the video signal processing circuit 52, the memory 54, and others by an input from the operation unit 56, which enables image capturing, recording, reproducing, and displaying suited for situations. The display panel 53 which is the display device according to the present invention can be used as a display unit for various electronic devices as well as the above display panel.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-140912 filed Jun. 21, 2010, which is hereby incorporated by reference herein in its entirety.

What is claimed is:

1. A display device on which a plurality of pixels including self-luminous elements is two-dimensionally arranged, the display device comprising:

each of a plurality of pixel circuits which is provided to each of the pixels and configured to supply a self-luminous element with a current or a voltage;

a plurality of power supply lines configured to supply the pixel circuits with power;

a plurality of data lines configured to supply the pixel circuits with gradation data;

a plurality of control signal lines configured to supply the pixel circuits with control signals; and a peripheral circuit configured to control the plurality of data lines and the plurality of control signal lines, said each of the pixel circuits including:

a driving transistor, having a gate electrode, a drain electrode and a source electrode, configured to supply the self-luminous element with the current or the voltage;

a storage capacitor provided between the gate electrode of the driving transistor and one of the control signal lines;

a first switch transistor configured to connect the gate electrode of the driving transistor with the drain electrode thereof; and a second switch transistor for controlling supply of current or voltage to the self-luminous element, wherein a gate electrode of the first switch transistor is connected directly or via a third switch transistor to the data line and is supplied from the data line with a binary signal to turn on and off the first switch transistor, and the peripheral circuit controls a time period of a voltage level of the binary signal which turns on the first switch transistor according to the gradation data.

2. A method for driving a display device on which a plurality of pixels including self-luminous elements is two-dimensionally arranged and which includes:

each of a plurality of pixel circuits which is provided to the each of the pixels and configured to supply the self-luminous element with a current or a voltage;

a plurality of power supply lines configured to supply the pixel circuits with power;

a plurality of data lines configured to supply the pixel circuits with gradation data;

a plurality of control signal lines configured to supply the pixel circuits with control signals; and a peripheral circuit configured to control the plurality of data lines and the plurality of control signal lines, said each of the pixel circuits including:

a driving transistor having a gate electrode, a drain electrode and a source electrode and configured to supply the self-luminous element with the current or the voltage;

a storage capacitor provided between a gate electrode of the driving transistor and one of the control signal lines;

a first switch transistor configured to connect the gate electrode of the driving transistor with the drain electrode thereof; and a second switch transistor for controlling supply of the current or the voltage to the self-luminous element, the method comprising, in the following order:

supplying a potential of a binary signal which turns on the first switch transistor to the data line and turning on the first switch transistor and the second switch transistor;

while the first switch transistor remains on, turning off the second switch transistor to cause a current of the driving transistor to flow into the storage capacitor through the first switch transistor, thereby moving a voltage of the gate electrode of the driving transistor so as to result in a threshold voltage of the driving transistor between the gate electrode and the source electrode of the driving transistor;

shifting the voltage of the gate electrode of the driving transistor to make a voltage between the gate electrode and the source electrode of the driving transistor larger than the threshold voltage;

while the second switch transistor remains off, turning on the first switch transistor for a time period according to the gradation data by supplying a potential of the binary signal which turns on the first switch transistor during the time period and thereafter supplying another potential of the binary signal which turns off the first switch transistor; and turning off the first switch transistor and turning on the second switch transistor to supply the current or the voltage to the self-luminous element.

3. The method according to claim 2, wherein said shifting the voltage of the gate electrode of the driving transistor is performed by a potential shift of the control signal line to which the storage capacitor is connected.

* * * * *